United States Patent
Okada et al.

(10) Patent No.: US 11,322,770 B2
(45) Date of Patent: May 3, 2022

(54) SOLID OXIDE FUEL CELL

(71) Applicant: Nissan Motor Co., Ltd., Yokohama (JP)

(72) Inventors: Keiji Okada, Kanagawa (JP); Keiji Ichihara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 36 days.

(21) Appl. No.: 17/042,275

(22) PCT Filed: Mar. 29, 2018

(86) PCT No.: PCT/JP2018/013443
§ 371 (c)(1),
(2) Date: Sep. 28, 2020

(87) PCT Pub. No.: WO2019/186959
PCT Pub. Date: Oct. 3, 2019

(65) Prior Publication Data
US 2021/0057772 A1  Feb. 25, 2021

(51) Int. Cl.
| | |
|---|---|
| *H01M 8/04701* | (2016.01) |
| *H01M 8/12* | (2016.01) |
| *H01M 8/2475* | (2016.01) |
| *H01M 8/04014* | (2016.01) |
| *H01M 8/2425* | (2016.01) |
| *H01M 8/248* | (2016.01) |

(52) U.S. Cl.
CPC ..... *H01M 8/2475* (2013.01); *H01M 8/04014* (2013.01); *H01M 8/04731* (2013.01); *H01M 8/12* (2013.01); *H01M 8/248* (2013.01); *H01M 8/2425* (2013.01); *H01M 2008/1293* (2013.01)

(58) Field of Classification Search
CPC ........... H01M 8/2475; H01M 8/04014; H01M 8/04731; H01M 8/12; H01M 8/2425; H01M 8/248; H01M 2008/1293; Y02E 60/50
USPC ........................................... 429/434
See application file for complete search history.

(56) References Cited

U.S. PATENT DOCUMENTS

| | | | | |
|---|---|---|---|---|
| 6,428,921 B1* | 8/2002 | Grot | ...... | H01M 8/247 429/470 |
| 7,776,488 B2* | 8/2010 | Evertz | ...... | H01M 8/248 429/511 |
| 2002/0114988 A1* | 8/2002 | Iwasaki | ...... | H01M 8/0612 429/415 |
| 2010/0221633 A1* | 9/2010 | Fujita | ...... | H01M 8/1011 429/452 |
| 2016/0308238 A1* | 10/2016 | Ichihara | ...... | H01M 8/241 |

FOREIGN PATENT DOCUMENTS

| | | |
|---|---|---|
| CN | 101593842 A | 12/2009 |
| CN | 102725897 A | 10/2012 |
| EP | 1 879 251 A1 | 1/2008 |
| JP | 6-188023 A | 7/1994 |

(Continued)

*Primary Examiner* — Christian Roldan
(74) *Attorney, Agent, or Firm* — Global IP Counselors, LLP

(57) ABSTRACT

A fuel cell includes a fuel cell stack, a casing, an application part, and a facilitating mechanism. The facilitating mechanism has a space that is provided between the casing and an upper current collector. The upper current collector and the casing are connected at inclined surfaces.

10 Claims, 12 Drawing Sheets

(56) References Cited

FOREIGN PATENT DOCUMENTS

| | | | |
|---|---|---|---|
| JP | 2006173055 | * | 12/2004 |
| JP | 2006-173055 | A | 6/2006 |
| JP | 2008-305686 | A | 12/2008 |
| JP | 2010-517230 | A | 5/2010 |
| JP | 2010-140666 | A | 6/2010 |
| JP | 5203162 | B2 | 6/2013 |
| JP | 2015-185466 | A | 10/2015 |
| JP | 2017-107664 | A | 6/2017 |
| WO | 2008/089977 | A1 | 7/2008 |

* cited by examiner

SOLID OXIDE FUEL CELL

CROSS-REFERENCE TO RELATED APPLICATIONS

This application is a U.S. national stage application of International Application No. PCT/JP2018/013443, filed on Mar. 29, 2018.

BACKGROUND

Technical Field

The present invention relates to a solid oxide fuel cell.

Background Information

A solid oxide fuel cell (SOFC; hereinafter sometimes simply referred to as "SOFC") has high thermal efficiency, is capable of electrochemically reacting fuel and air without using a noble metal catalyst, and can use numerous types of fuels. The SOFC has a fuel cell stack that is configured by stacking a plurality of cell units, including an electrolyte electrode assembly that generates power by using a supplied gas, and a separator that defines a flow path portion through which the gas flows.

The SOFC will expand in the fuel cell stacking direction during its operation at high temperatures of about 700-1200° C. due to linear expansion, compared to when operation is stopped, i.e., at room temperature. More specifically, at the time of a rapid start peculiar to a vehicle-mounted system, high-temperature gas circulates inside the fuel cell stack to raise the temperature. For this reason, as opposed to the structural components of the fuel cell, the electrolyte electrode assembly is heated first and expands linearly, causing the risk that an excessively compressive load will act on the electrolyte electrode assembly.

In this regard, Japanese Laid-Open Patent Application No. 2017-107664 (Patent Document 1), for example, cited below, discloses a fuel cell in which an elastic body is provided between a cell stack and a housing such that when a load is applied to the cell stack, the elastic body is compressed and deforms. By using a fuel cell configured in this manner, the elastic body can absorb the linear expansion of the fuel cell stack, and it is possible to prevent an excessively compressive load from acting on the electrolyte electrode assembly.

SUMMARY

However, in the fuel cell disclosed in Patent Document 1, separate provision for an elastic body must be made, and the overall size of the fuel cell is increased.

In order to solve the problem described above, an object of the present invention is to provide a fuel cell that can prevent an excessively compressive load from acting on the electrolyte electrode assembly while preventing an increase in size.

A fuel cell according to the present invention, which achieves the object described above, includes a fuel cell stack configured by stacking a plurality of cell units, each including an electrolyte electrode assembly and a separator, and a casing disposed at one end side of the fuel cell stack in the stacking direction. In addition, the fuel cell includes an application part that applies a stacking force to the fuel cell stack along the stacking direction via the casing, and a facilitating mechanism that facilitates the elongation of the casing due to linear expansion. The facilitating mechanism has a space that is provided between the casing and an end current collector, which is provided at an end portion on one end side of the fuel cell stack and that absorbs the linear expansion of the fuel cell stack in the stacking direction. Each of the end current collector and the casing includes an inclined surface that is inclined relative to the stacking direction, and the end current collector plate and the casing are interconnected at the inclined surfaces via the space.

BRIEF DESCRIPTION OF THE DRAWINGS

Referring now to the attached drawings which form a part of this original disclosure.

DETAILED DESCRIPTION OF EMBODIMENTS

Figure 1:
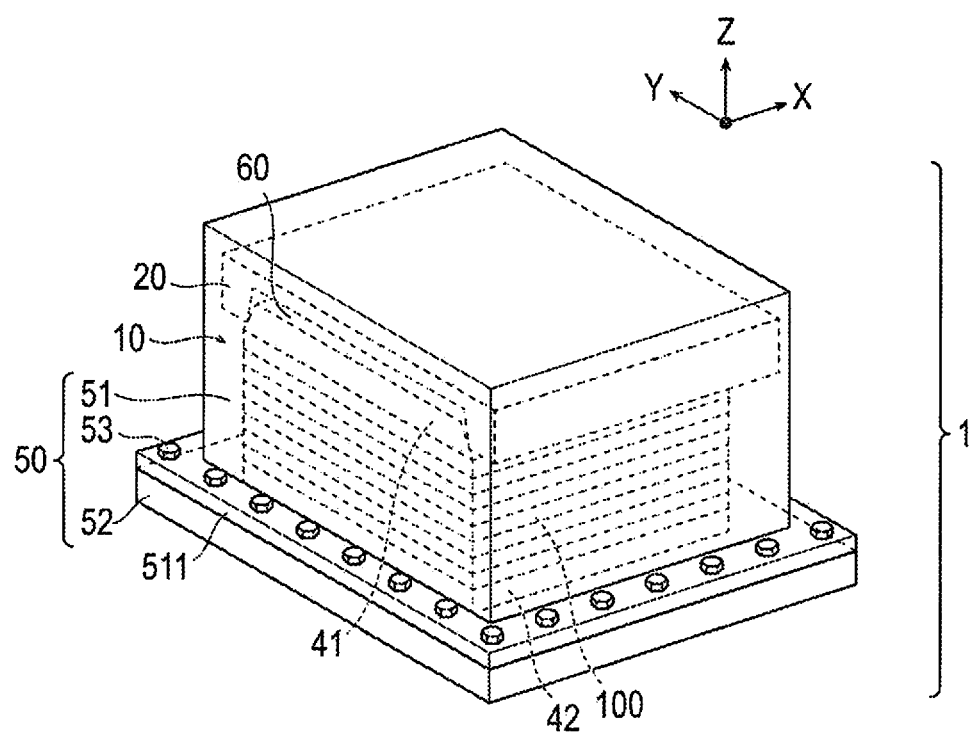
FIG. 1 is a perspective view illustrating a fuel cell according to an embodiment of the present invention.

Embodiments of the present invention will be explained below, with reference to the appended drawings. The description below does not limit the technical scope or the meanings of the terms described in the Claims. Furthermore, the dimensional ratios in the drawings are exaggerated for the sake of convenience of explanation and may differ from the actual ratios.

A fuel cell 1 according to the present embodiment will be described with reference to FIGS. 1 to 10. The fuel cell stack 1 according to the present embodiment uses a solid oxide fuel cell (SOFC) as an electrolyte, which uses an oxide ion conductor such as stabilized zirconia.

For the sake of convenience of the explanation below, an XYZ orthogonal coordinate system is shown is the drawings. The x-axis and the y-axis are parallel to the horizontal direction, and the z-axis is parallel to the vertical direction (corresponding to the stacking direction).

Figure 2:
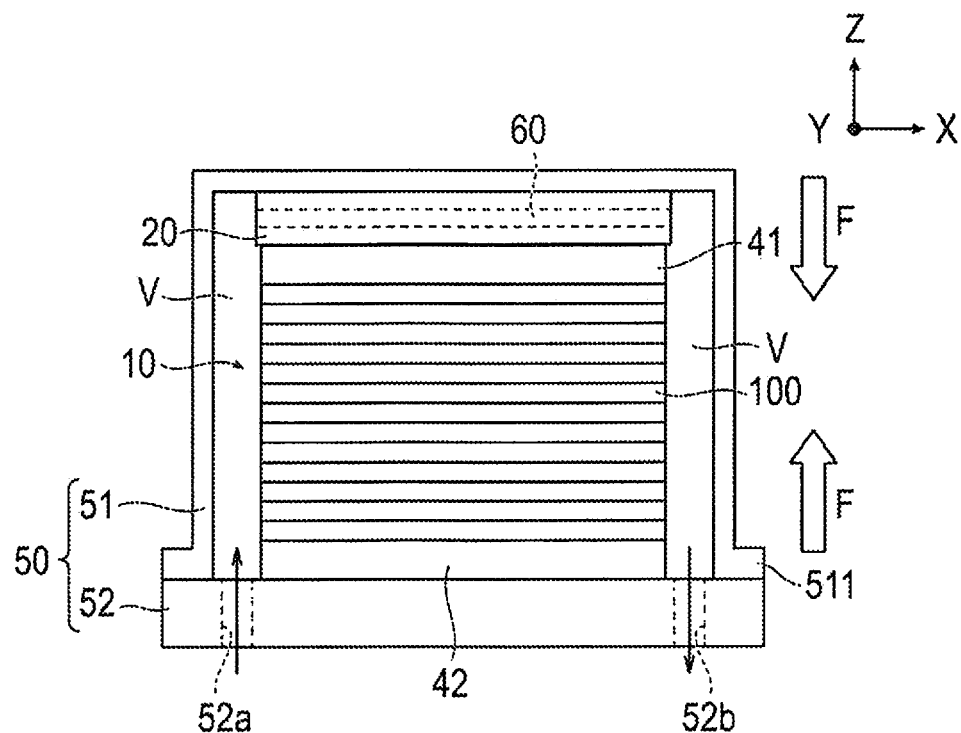
FIG. 2 is a schematic cross-sectional view illustrating the fuel cell according to the present embodiment.
Figure 3:
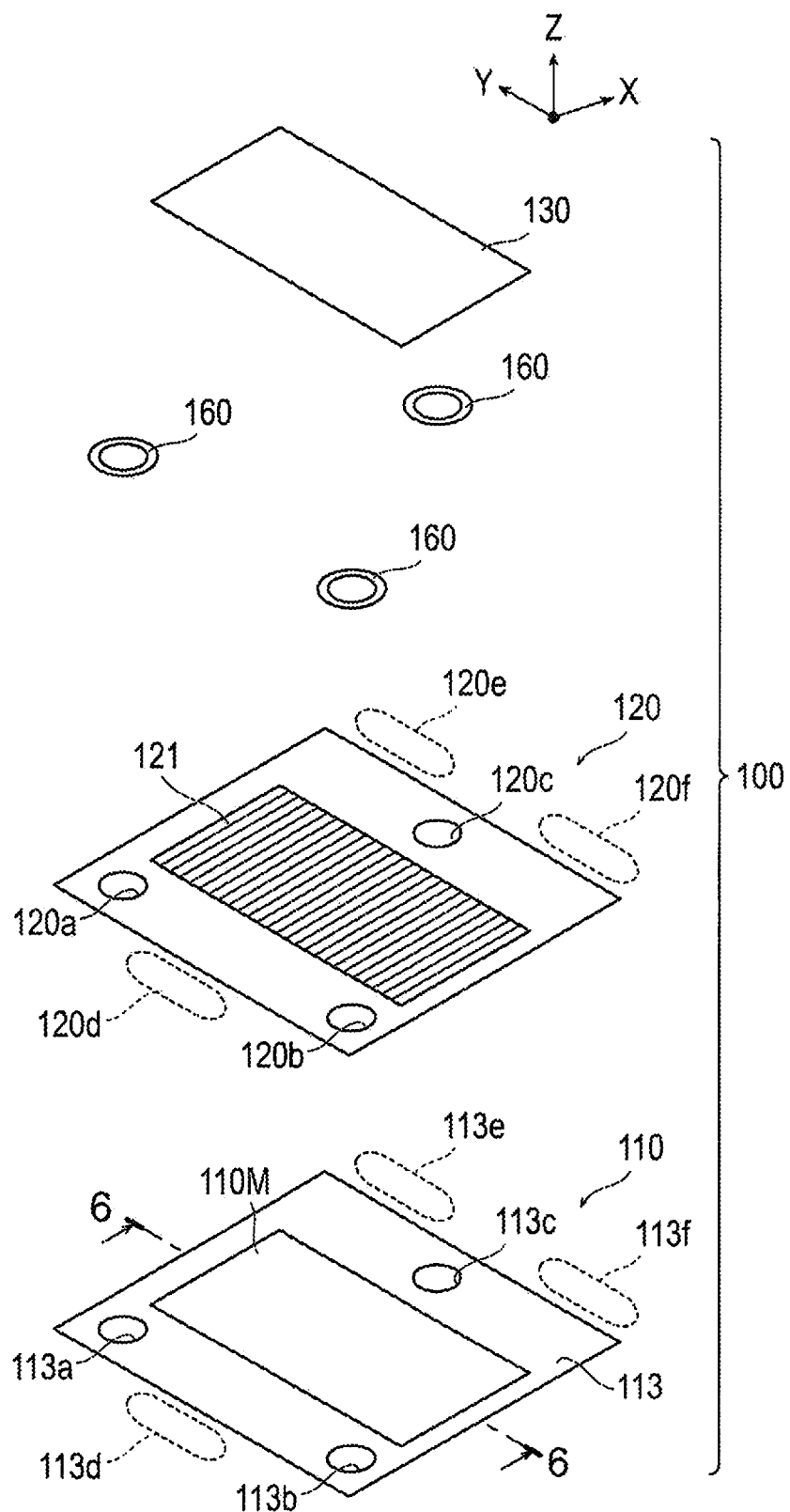
FIG. 3 is an exploded perspective view of a cell unit.
Figure 4:
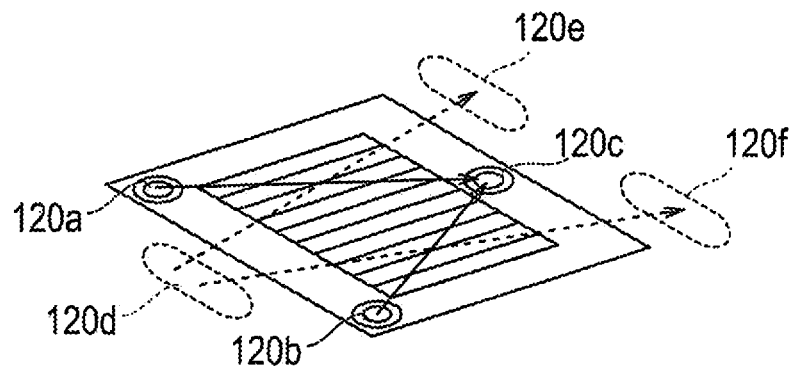
FIG. 4 is a view illustrating flow of anode gas and cathode gas.
Figure 5:
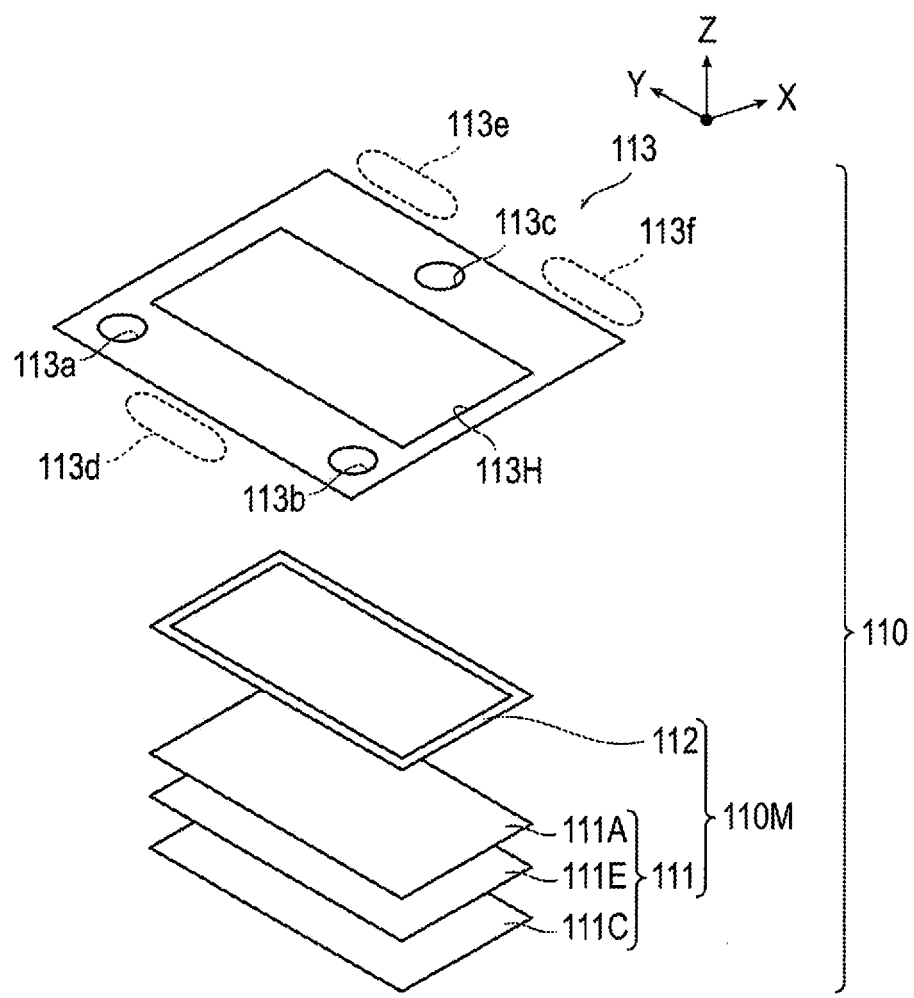
FIG. 5 is an exploded perspective view of a metal support cell assembly.
Figure 6:
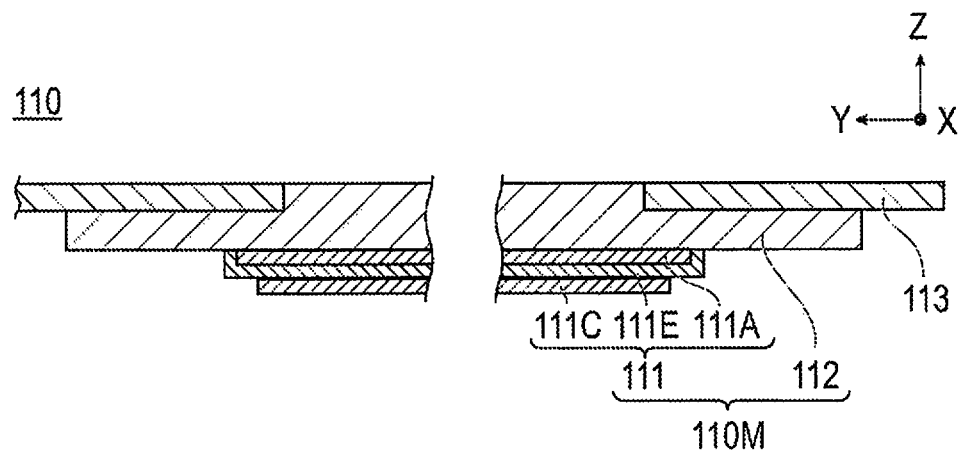
FIG. 6 is a cross-sectional view along line 6-6 of FIG. 3.
Figure 7:
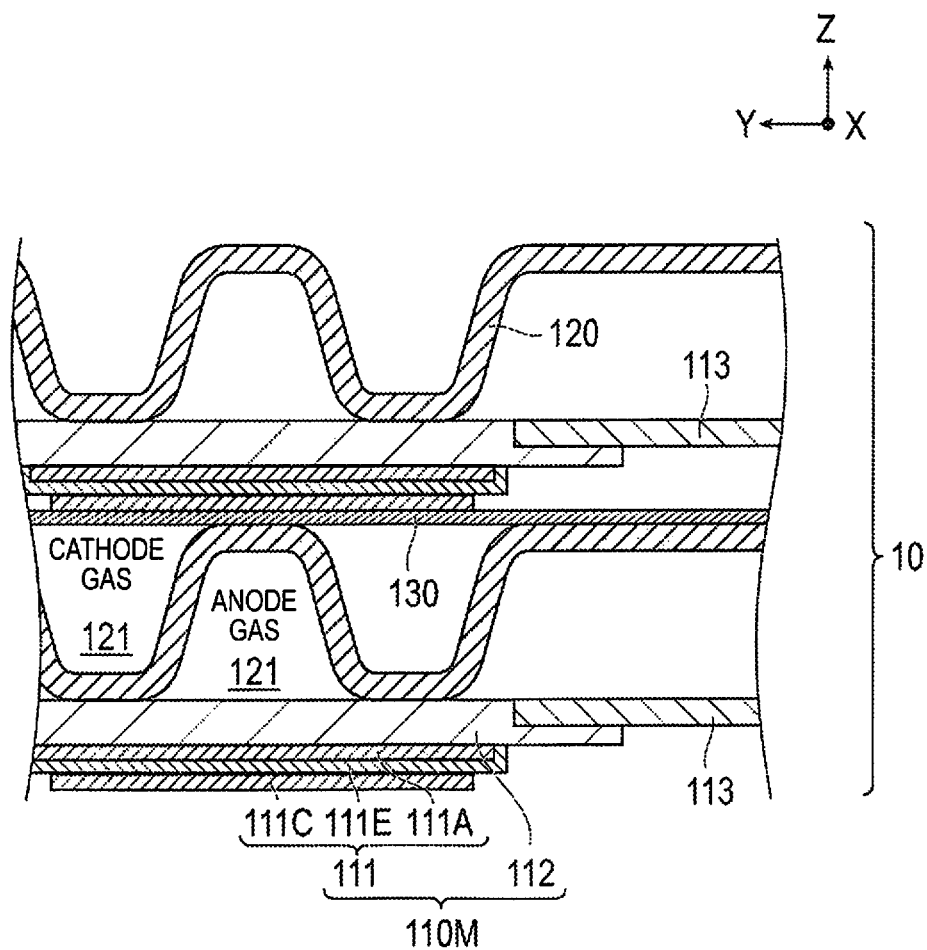
FIG. 7 is a cross-sectional view of a fuel cell stack.
Figure 8:
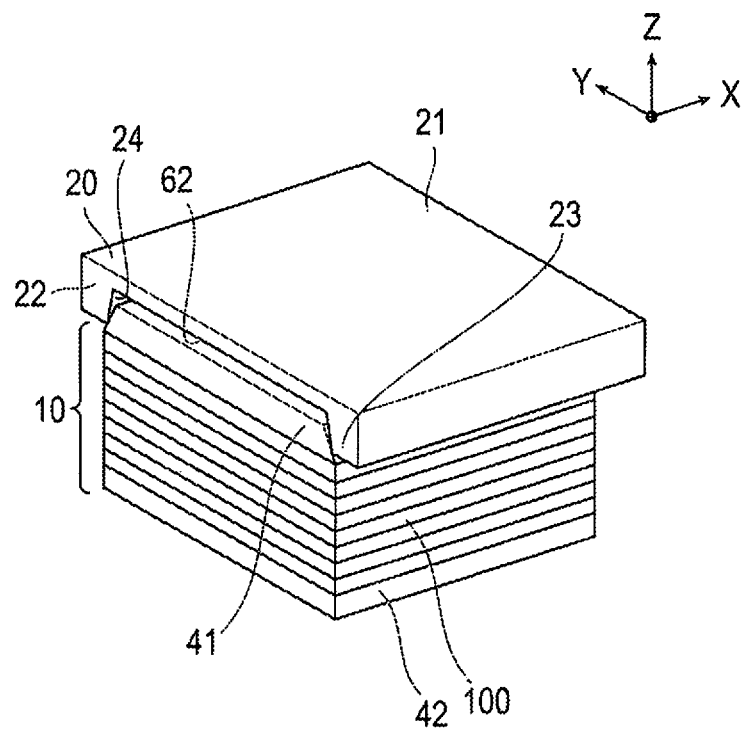
FIG. 8 is a perspective view illustrating the fuel cell stack and a casing.
Figure 9:
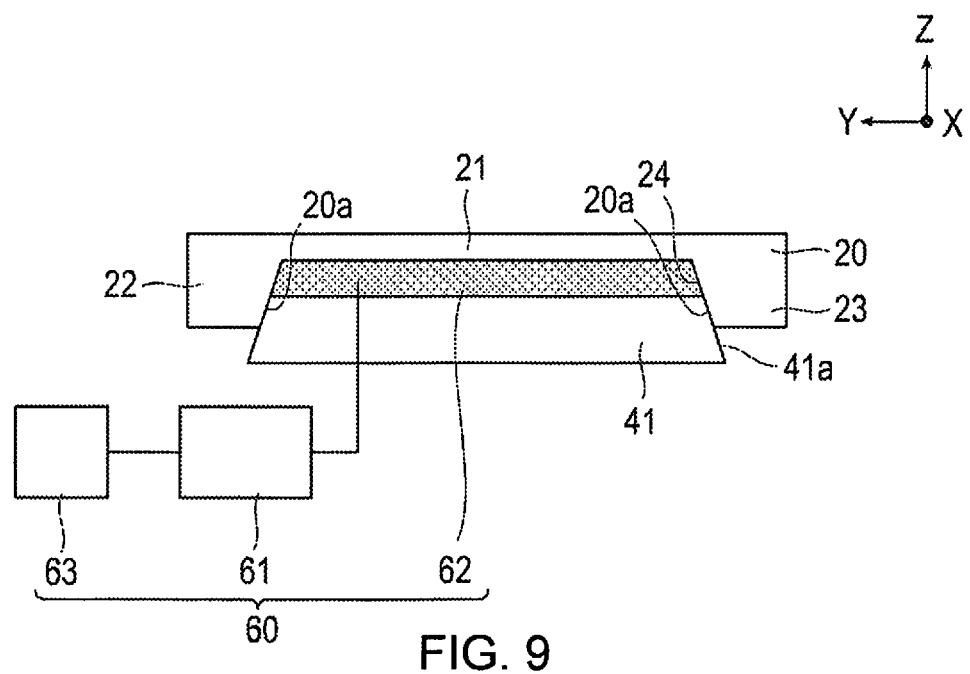
FIG. 9 is a view for explaining a gas flow passage provided between the casing and an upper current collector.
Figure 10:
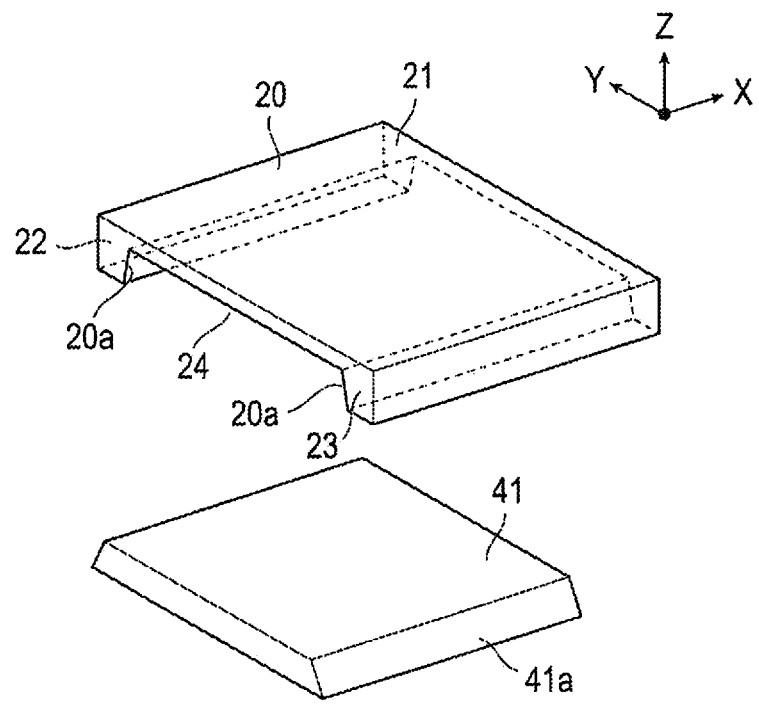
FIG. 10 is an exploded perspective view of the casing and the upper current collector.

FIG. 1 is a perspective view illustrating the fuel cell 1 according to an embodiment of the present invention. FIG. 2 is a schematic cross-sectional view illustrating the fuel cell 1 according to the present embodiment. FIG. 3 is an exploded perspective view of a cell unit 100. FIG. 4 is a view illustrating the flow of anode gas and cathode gas. FIG. 5 is an exploded perspective view of a metal support cell assembly 110. FIG. 6 is a cross-sectional view along line 6-6 of FIG. 3. FIG. 7 is a cross-sectional view of a fuel cell stack 10. FIG. 8 is a perspective view illustrating the fuel cell stack 10 and a casing 20. FIG. 9 is a view for explaining a space 62 provided between the casing 20 and an upper current collector 41. FIG. 10 is an exploded perspective view of a casing 20 and an upper current collector 41.

In brief, the fuel cell 1 includes the fuel cell stack 10, which is configured by stacking a plurality of cell units 100, each of which includes an electrolyte electrode assembly 111 and a separator 120, and the casing 20 disposed above the fuel cell stack 10 in the Z direction. The fuel cell 1 includes an application part 50 that applies stacking force F to the fuel cell stack 10 along the Z direction via the casing 20, and a facilitating mechanism 60 that facilitates the elongation of the casing 20 due to linear expansion. The facilitating mechanism 60 has a space (corresponding to a gas flow passage) 62 that is provided between the casing 20 and the upper current collector 41 (corresponding to an end current collector), which is provided at the uppermost portion of the fuel cell stack 10, and that absorbs the linear expansion of the fuel cell stack 10 in the Z direction. In addition, inclined surfaces 41a, 20a, which are inclined relative to the Z direction, are provided on the upper current collector 41 and the casing 20, respectively, and the upper current collector 41 and the casing 20 are connected to each other via the space 62 at the inclined surfaces 41a, 20a. The configuration of the fuel cell 1 according to the present embodiment will be described in detail below.

As shown in FIGS. 1 and 2, the fuel cell 1 has the fuel cell stack 10, the casing 20, the application part 50, and the facilitating mechanism 60.

Fuel Cell Stack 10

As shown in FIGS. 1 and 2, the fuel cell stack 10 has a plurality of cell units 100, the upper current collector 41 provided above the cell units 100, and a lower current collector 42 provided below the cell units 100.

As shown in FIG. 3, the cell unit 100 is configured by sequentially stacking the metal support cell assembly 110, the separator 120 in which flow passage portions 121 for circulating gas are defined between the electrolyte electrode assembly 111, and an auxiliary current collector layer 130. A contact material may be disposed between the metal support cell assembly 110 and the auxiliary current collector layer 130 so as to bring the two into conductive contact, or the auxiliary current collector layer 130 may be omitted.

Furthermore, as shown in FIGS. 3 and 4, the cell unit 100 also has a plurality of seals 160 that seal the peripheries of an anode gas first inflow port 120a, an anode gas second inflow port 120b, and an anode gas first outflow port 120c provided in the separator 120, thereby restricting the flow of gas.

As shown in FIGS. 3 and 5, the metal support cell assembly 110 has a metal support cell (MSC) 110M, which is disposed in the vicinity of the center, and a cell frame 113 that holds the outer circumference of the metal support cell 110M.

As shown in FIGS. 5 and 6, the metal support cell 110M has the electrolyte electrode assembly 111, which is obtained by sandwiching an electrolyte 111E from both sides between an anode 111A and a cathode 111C, and a metal support portion 112 that is made of metal that supports the electrolyte electrode assembly 111 from one side in the vertical direction. The metal support cell 110M has better mechanical strength and rapid activating ability than electrolyte-supported cells and electrode-supported cells.

As shown in FIGS. 5 and 6, the electrolyte electrode assembly 111 is formed by sandwiching the electrolyte layer 111E from both sides between the anode 111A and the cathode 111C.

The electrolyte 111E allows oxide ions to pass from the cathode 111C to the anode 111A. The electrolyte 111E allows oxide ions to pass but does not allow gas and electrons to pass. An example of a material forming the electrolyte 111E is a solid oxide ceramic, such as stabilized zirconia, in which yttria, neodymium oxide, samaria, gadria, scandia, and the like have been doped.

The anode 111A is a fuel electrode and reacts an anode gas (for example, hydrogen) with oxide ions in order to generate oxides of the anode gas and extract electrons. The anode 111A is resistant to a reducing atmosphere, allows the anode gas to pass therethrough, has high electrical (electron and ion) conductivity, and has a catalytic action to react the anode gas with the oxide ions. Examples of materials for forming the anode 111A include those in which a metal, such as nickel, and an oxide ion conductor, such as yttria-stabilized zirconia, are mixed.

The cathode 111C is an oxidant electrode and reacts a cathode gas (for example, oxygen contained in air) with electrons to convert oxygen molecules to oxide ions. The cathode 111C is resistant to an oxidizing atmosphere, allows the cathode gas to pass therethrough, has high electrical (electron and ion) conductivity, and has a catalytic action to convert oxygen molecules into oxide ions. Examples of materials for forming the cathode 111C include oxides of lanthanum, strontium, manganese, cobalt, and the like.

As shown in FIGS. 5 and 6, the metal support portion 112 supports the electrolyte electrode assembly 111 from the anode 111A side. The metal support portion 112 is a porous metal having gas permeability and electrical conductivity. Examples of materials for forming the metal support portion 112 include corrosion-resistant alloys containing nickel and chromium, corrosion-resistant steel, and stainless steel.

As shown in FIGS. 5 and 6, the cell frame 113 holds the metal support cell 110M from the periphery. The cell frame 113 has an opening 113H. The metal support cell 110M is disposed in the opening 113H of the cell frame 113. The outer circumference of the metal support cell 110M is joined to the inner edge of the opening 113H of the cell frame 113. Examples of materials for forming the cell frame 113 include metals whose surfaces have been subjected to an insulation treatment.

As shown in FIGS. 3 and 5, the cell frame 113 has an anode gas first inflow port 113a, an anode gas second inflow port 113b, and an anode gas first outflow port 113c, through which ports the anode gas flows. In addition, a cathode gas first inflow port 113d, a cathode gas first outflow port 113e, and a cathode gas second outflow port 113f, through which ports the cathode gas flows, are formed on the outer circumference of the cell frame 113. As shown in FIGS. 3 and 5, the cathode gas first inflow port 113d is formed on the outer circumference of the cell frame 113 between the anode gas first inflow port 113a and the anode gas second inflow port 113b. In addition, the cathode gas first outflow port 113e and the cathode gas second outflow port 113f are formed on the outer circumference of the cell frame 113 on one side and the other of the anode gas first outflow port 113c.

In this manner, the cathode gas first inflow port 113d, the cathode gas first outflow port 113e, and the cathode gas second outflow port 113f, through which ports the cathode gas flows, are formed in a space V that is formed between the inner circumferential surface of an upper casing hood 51 of the application part 50, described further below, and the outer circumferential surface of the fuel cell stack 10, as shown in FIG. 2.

As shown in FIG. 7, the separator 120 is disposed between the metal support cells 110M, which are adjacent to each other in the Z direction. The separator 120 has flow passage portions 121 in a region opposing the electrolyte electrode assembly 111 of the metal support cell 110M. The flow passage portions 121 have convex-concave shapes that define flow passages for gas with the electrolyte electrode assembly 111. An example of a material for forming the separator 120 is metal. An insulation treatment is applied to the regions of the separator 120 except the flow passage portions 121.

The flow passage portions 121 of the separator 120 are formed in an essentially linear shape such that the convex-concave shapes extend in the Y direction. As a result, the direction of flow of the gas that flows along the flow passage portions 121 is the X direction.

As shown in FIGS. 3 and 4, the separator 120 has an anode gas first inflow port 120a, an anode gas second inflow port 120b, and an anode gas first outflow port 120c, through which ports the anode gas flows. In addition, a cathode gas first inflow port 120d, a cathode gas first outflow port 120e, and a cathode gas second outflow port 120f, through which ports the cathode gas flows, are formed on the outer circumference of the separator 120. As shown in FIGS. 3 and 4, the cathode gas first inflow port 120d is formed on the outer circumference of the separator 120 between the anode gas first inflow port 120a and the anode gas second inflow port 120b. In addition, the cathode gas first outflow port 120e and the cathode gas second outflow port 120f are formed on the outer circumference of the separator 120 on one side and the other of the anode gas first outflow port 120c.

In this manner, the cathode gas first inflow port 120d, the cathode gas first outflow port 120e, and the cathode gas second outflow port 120f, through which ports the cathode gas flows, are formed in the space V that is formed between the inner circumferential surface of an upper casing hood 51 of the application part 50, described further below, and the outer circumferential surface of the fuel cell stack 10, as shown in FIG. 2.

As shown in FIG. 7, the auxiliary current collector layer 130 is disposed between the metal support cell 110M and the separator 120, forms a space through which gas passes, equalizes surface pressure, and the like, and assists the electrical contact between the metal support cell 110M and the separator 120. The auxiliary current collector layer 130 is a wire mesh expanded metal, for example. The auxiliary current collector layer can be omitted if its characteristics and functions can be realized by another element.

The seal 160 is formed from a material with heat resistance and sealing properties. An example of such a material is Thermiculite (registered trademark), the main material of which is vermiculite (vermiculite). Alternatively, it is also possible to use a seal made of a glass component.

The upper current collector 41 outputs the electrical power that is generated by the cell unit 100 to the outside.

As shown in FIG. 8, as viewed from the Z direction, the upper current collector 41 has the same outer shape as the cell unit 100. The upper current collector 41 is provided with a terminal (not shown) that is connected to an external current source. The upper current collector 41 is made from a conductive material that does not allow gas permeation, and, except for the terminal portion and regions that oppose the electrolyte electrode assembly 111 of the cell unit 100, is insulated with an insulating material or a coating. The insulating material is formed, for example, by fixing aluminum oxide onto the upper current collector 41.

As shown in FIG. 9, the upper current collector 41 has an inclined surface 41a, which is inclined with respect to the Z direction such that the width decreases upwardly in the Z direction. The inclined surface 41a is formed in the X direction. At room temperature, the inclined surface 41a is connected (engaged) with an inclined surface 20a provided on the casing 20.

The lower current collector 42 outputs the electrical power generated by the cell unit 100 to the outside.

As shown in FIG. 8, as viewed from the Z direction, the lower current collector 42 has the same outer shape as the cell unit 100. The lower current collector 42 is provided with a terminal (not shown) that is connected to an external current source. The lower current collector 42 is made from a conductive material that does not allow gas permeation, and, except for the terminal portion and regions that oppose the electrolyte electrode assembly 111 of the cell unit 100, is insulated using an insulating material or a coating. The insulating material is formed by fixing aluminum oxide onto the lower current collector 42, for example.

Casing 20

As shown in FIG. 8, the casing 20 is disposed above the fuel cell stack 10 in the Z direction. The casing 20 is made from a conductive material that does not allow gas permeation. The casing 20 is made of metal, for example.

As shown in FIGS. 9 and 10, the casing 20 includes a flat surface portion 21 in the XY plane, a first extension portion 22 and a second extension portion 23 that extend from both ends of the flat surface portion 21 in the Y direction and that extend downward in the Z direction, and a groove portion 24 provided between the first extension portion 22 and the second extension portion 23.

As shown in FIGS. 9 and 10, the inclined surface 20a, which is inclined with respect to the Z direction such that the width decreases upwardly in the Z direction, is provided on the inward side of the first extension portion 22 and the second extension portion 23 of the casing 20 in the Y direction.

As shown in FIG. 9, the groove portion 24 is configured such that the space 62 is formed between the casing 20 and the upper current collector 41 at room temperature. In addition, the groove portion 24 is configured such that the space 62 between the casing 20 and the upper current collector 41 is sealed when the fuel cell 1 is heated (refer to FIGS. 11 and 12).

The coefficient of linear expansion of the casing 20 is preferably greater than the coefficient of linear expansion of the upper current collector 41. By using this configuration, since, during heating, the casing 20 expands more in the Y direction than the upper current collector 41, the space 62 between the casing 20 and the upper current collector 41 is sealed accompanying the linear expansion of the fuel cell stack 10 in the Z direction. For this reason, it is possible to suitably prevent an excessively compressive load from acting on the electrolyte electrode assembly 111. Materials such as austenitic SUS can be used for the casing 20, and ferritic SUS can be used for the upper current collector 41.

Application Part 50

The application part 50 applies the stacking force F to the fuel cell stack 10 along the Z direction (refer to FIG. 2). As shown in FIGS. 1 and 2, the application part 50 includes the upper casing hood 51, a lower casing hood 52, and a fastener 53.

As shown in FIG. 2, the upper casing hood 51 forms the space V, which is the cathode gas flow passage, with the fuel cell stack 10.

As shown in FIGS. 1 and 2, the upper casing hood 51 covers the fuel cell stack 10 and the casing 20 from above. The upper casing hood 51 is box-shaped with an open lower portion. In addition, on the lower side in the Z direction, the upper casing hood 51 has a collar portion 511 that extends outwardly in the XY plane. A through-hole (not shown), through which the fastener 53 passes, is formed on the collar portion 511 in the Z direction.

The upper casing hood 51 is made of metal, for example, and the interior surface is insulated with an insulating material or a coating. The insulating material is formed, for example, by fixing aluminum oxide onto the upper casing hood 51.

FIG. 2 shows the lower casing hood 52, which is provided for externally supplying/discharging cathode gas to/from the plurality of cell units 100. The lower casing hood 52 has a cathode gas inflow hole 52a into which the cathode gas flows, and a cathode gas outflow hole 52b from which the cathode gas flows out.

As shown in FIG. 2, the lower casing hood 52 is provided below the lower current collector 42. As viewed from the Z direction, the lower casing hood 52 has the same shape as the collar portion 511 of the upper casing hood 51.

The lower casing hood 52 is provided with through-holes that are formed in the Z direction in locations that correspond to the through-holes formed in the collar portion 511.

In order to fasten the upper casing hood 51 to the lower casing hood 52, the fastener 53 are inserted into the through-holes provided in the collar portion 511 of the upper casing hood 51 and the through-holes provided in the lower casing hood 52. The fastener 53 are nuts and bolts.

Facilitating Mechanism 60

The facilitating mechanism 60 facilitates the elongation of the casing 20 due to linear expansion. As shown in FIG. 9, the facilitating mechanism 60 has a heater 61 for heating the cathode gas and a gas flow passage 62 through which the cathode gas heated by the heater 61 flows. The facilitating mechanism 60 also has a blower 63 that supplies the cathode gas heated by the heater 61 to the space V that is formed between the upper casing hood 51 and the fuel cell stack 10.

The heater 61 heats the cathode gas that flows into the space V that is formed between the upper casing hood 51 and the fuel cell stack 10. A heat exchanger included in a common fuel cell system may be used as the heater 61.

As shown in FIGS. 8 and 9, the gas flow passage 62 is provided between the casing 20 and the upper current collector 41. The gas flow passage 62 is formed in the X direction. The gas flow passage 62 is provided in communication with the space V that is formed between the upper casing hood 51 and the fuel cell stack 10.

Figure 11:
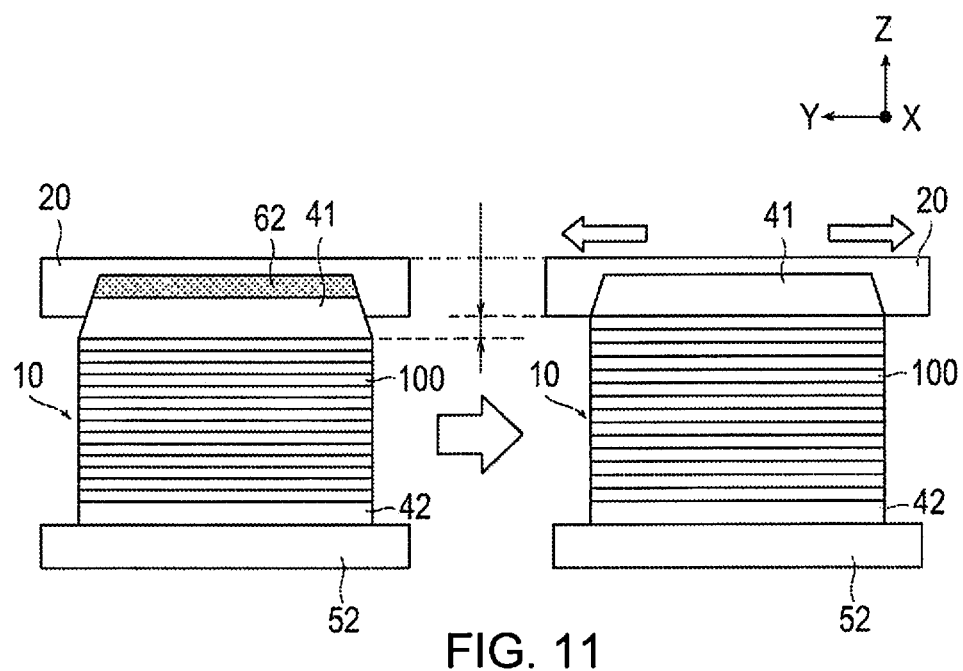
FIG. 11 is a view illustrating the states before and after a groove portion of the casing extends in the Y direction.
Figure 12:
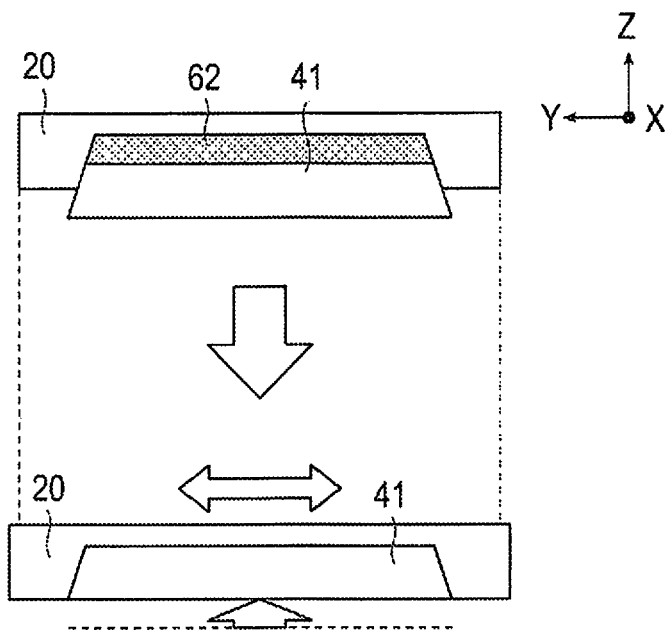
FIG. 12 is a partially enlarged view illustrating the states before and after the groove portion of the casing extends in the Y direction.
Figure 13:
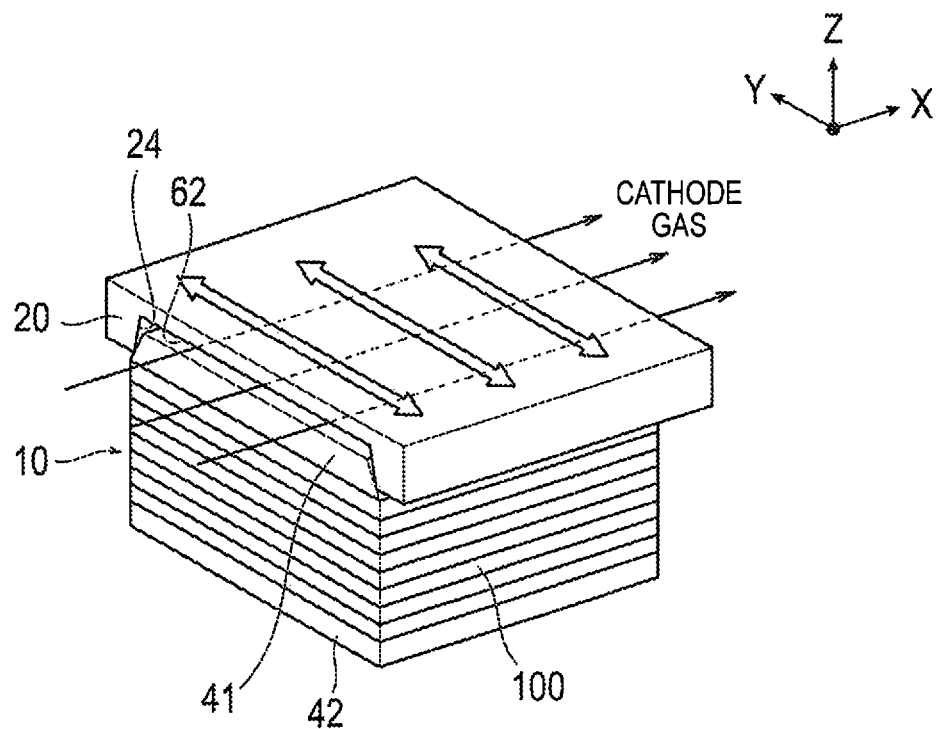
FIG. 13 is a view for explaining the distribution along the X direction of the extension lengths of the groove portion of the casing along the Y direction.
Figure 14:
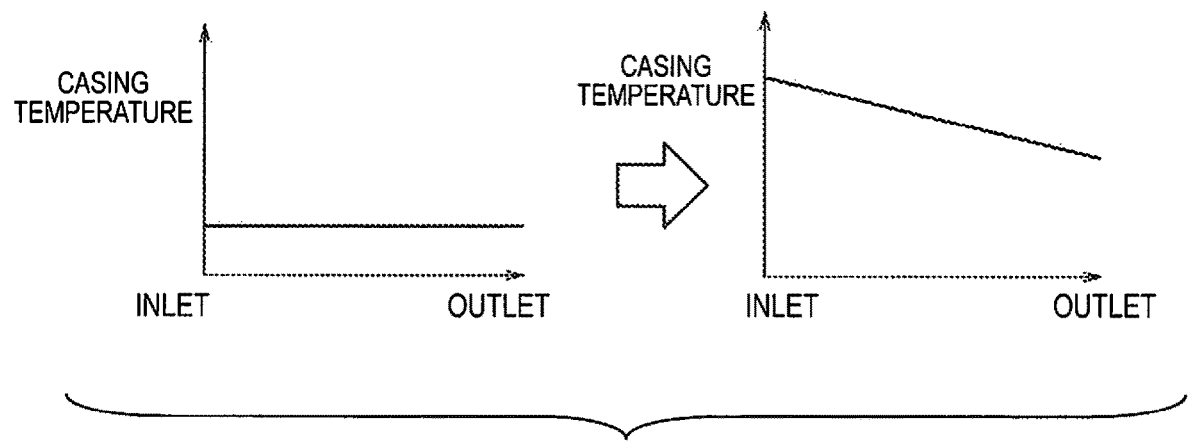
FIG. 14 shows graphs illustrating the temperature distribution of the casing at room temperature and during heating.
Figure 15:
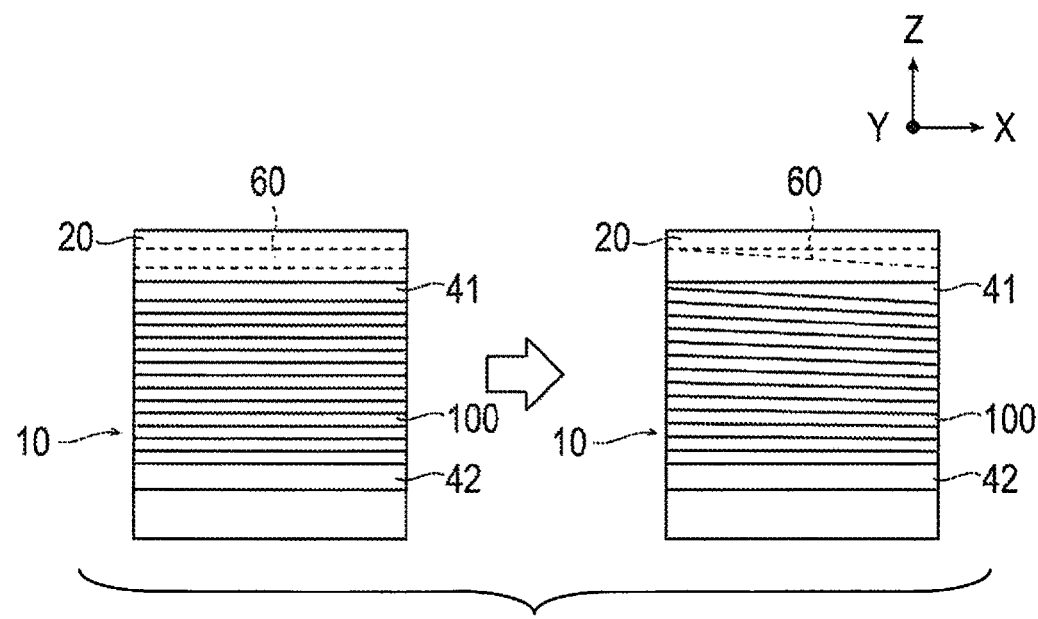
FIG. 15 is a side view of the fuel cell at room temperature and during heating.

The action and effects of the fuel cell 1 according to the present embodiment will now be described with reference to FIGS. 11 to 15. FIG. 11 is a view illustrating the states before (left figure) and after (right figure) the groove portion 24 of the casing 20 extends in the Y direction. FIG. 12 is a partially enlarged view illustrating the states before (left figure) and after (right figure) the groove portion 24 of the casing 20 extends in the Y direction. FIG. 13 is a view for explaining the distribution along the X direction of the extension lengths of the groove portion 24 of the casing 20 along the Y direction. FIG. 14 shows graphs illustrating the temperature distribution of the casing 20 at room temperature (left graph) and during heating (right graph). FIG. 15 is a side view of the fuel cell 1 at room temperature (left figure) and during heating (right figure).

First, the cathode gas heated by the heater 61 is supplied to the space V that is formed between the upper casing hood 51 and the fuel cell stack 10 (refer to FIG. 2). Then the cathode gas supplied to the space V flows into the flow passage portions 121 of the fuel cell stack 10 and the gas flow passage 62 connected to the space V.

Due to the high-temperature cathode gas that flows into the fuel cell stack 10, the electrolyte electrode assembly 111 expands linearly in the Z direction. In addition, due to the high-temperature gas cathode gas that flows into the gas flow passage 62, the groove portion 24 of the casing 20 extends in the Y direction. As a result, as shown in FIGS. 11 and 12, the upper current collector 41 moves toward the casing 20 such that the inclined surface 41a of the upper current collector 41 moves along the inclined surface 20a of the casing 20 (refer to FIG. 9). Therefore, since the elongation of the electrolyte electrode assembly 111 due to the linear expansion in the Z direction is absorbed, it is possible to suitably prevent an excessively compressive load from acting on the electrolyte electrode assembly 111.

The distribution along the X direction of the linear expansion of the groove portion 24 of the casing 20 in the Y direction will now be described.

The temperature of the cathode gas that flows into the gas flow passage 62 gradually decreases from the inlet side of the gas flow passage 62 (lower left side of FIG. 13) to the outlet side of the gas flow passage 62 (upper right side of FIG. 13). For this reason, as shown in FIG. 14, whereas at room temperature, the temperature of the casing 20 is uniform from the inlet to the outlet (left side of FIG. 14), during heating, the overall temperature of the casing 20 increases, gradually decreasing from the inlet to the outlet (right side of FIG. 14). Thus, as indicated by the hollow arrows in FIG. 13, the elongation of the groove portion 24 of the casing 20 in the Y direction is greater on the inlet side of the gas flow passage 62 than on the outlet side of the gas flow passage 62.

The temperature of the cathode gas that flows into the flow passage portions 121 of the fuel cell stack 10, on the other hand, gradually decreases from the inlet side (lower left side of FIG. 13) to the outlet side (upper right side of FIG. 13), in the same manner as the cathode gas that flows into the gas flow passage 62. For this reason, as shown in FIG. 15, during heating, the linear elongation of the electrolyte electrode assembly 111 in the Z direction is greater on the inlet side (left side of each figure of FIG. 15) than on the outlet side (right side of each figure of FIG. 15).

As described above, the in-plane temperature distribution of the casing 20 in the XY plane during heating becomes similar to the in-plane temperature distribution of the electrolyte electrode assembly 111. That is, the locations of greatest elongation of the electrolyte electrode assembly 111 in the Z direction correspond to the locations of greatest extension of the casing 20 in the Y direction. Thus, it is possible to prevent an excessively compressive load from acting on the electrolyte electrode assembly 111 across the entire region of the XY plane.

In the present embodiment, as shown in FIG. 11, during heating, as the fuel cell stack 10 linearly expands in the Z direction, the upper current collector 41 moves toward the casing 20 in order to seal the gas flow passage 62. For example, if the configuration is such that the gas flow passage 62 is not sealed when the upper current collector 41 moves toward the casing 20, the fuel cell stack could unintendedly be cooled by the gas that flows into the gas flow passage 62 during power generation operation after heating, thereby reducing the performance of the fuel cell. In contrast, by using the fuel cell 1 of the present embodiment, since the gas flow passage 62 is sealed during heating, it is possible to prevent the unintended cooling of the fuel cell stack 10. A configuration in which the gas flow passage 62 is not sealed when the upper current collector 41 moves toward the casing 20 is also included in the present invention.

In addition, for example, in a case in which an elastic body is provided, as disclosed in the prior art document, there is the possibility of stress becoming concentrated on the electrolyte electrode assembly 111 corresponding to the location where the elastic body is provided, due to the reaction force from the electrode body. In contrast, by using the fuel cell 1 of the present embodiment, since the upper current collector 41 moves to the gas flow passage 62, it is possible to prevent the stress from becoming concentrated on the electrolyte electrode assembly 111.

Figure 16:
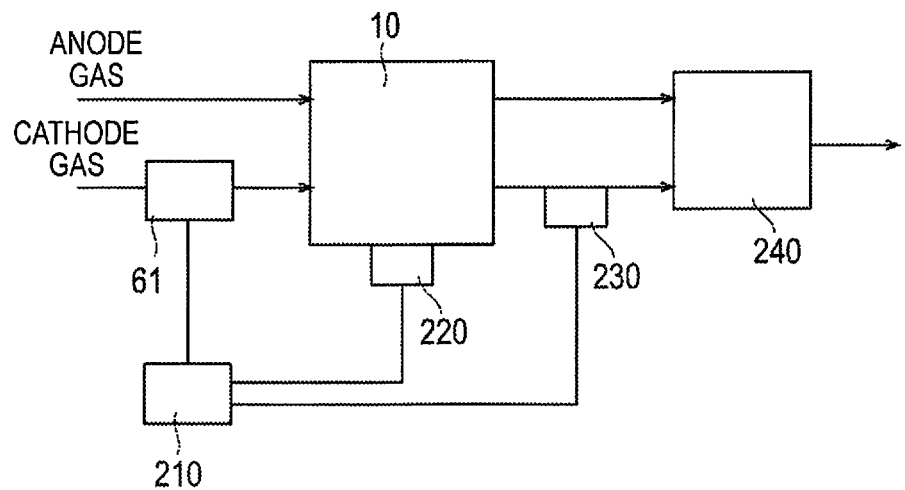
FIG. 16 is a schematic overview illustrating a fuel cell system.

The configuration of a fuel cell system 200 will now be described with reference to FIG. 16. FIG. 16 is a schematic overview illustrating the fuel cell system 200.

As shown in FIG. 16, the anode gas is supplied to the fuel cell stack 10. The cathode gas is supplied to the fuel cell stack 10 via the heater 61. A first thermometer 220 is installed in the fuel cell stack 10 to measure the temperature inside the fuel cell stack 10. The anode gas and the cathode gas discharged from the fuel cell stack 10 are discharged via an exhaust heat exchanger 240. A second thermometer 230 is installed in a pipe through which the cathode gas flows between the fuel cell stack 10 and the exhaust heat exchanger 240 to measure the temperature of the cathode gas in the pipe. A control unit 210 controls the heater 61, the reading of the first thermometer 220 and the second thermometer 230, etc.

Figure 17:
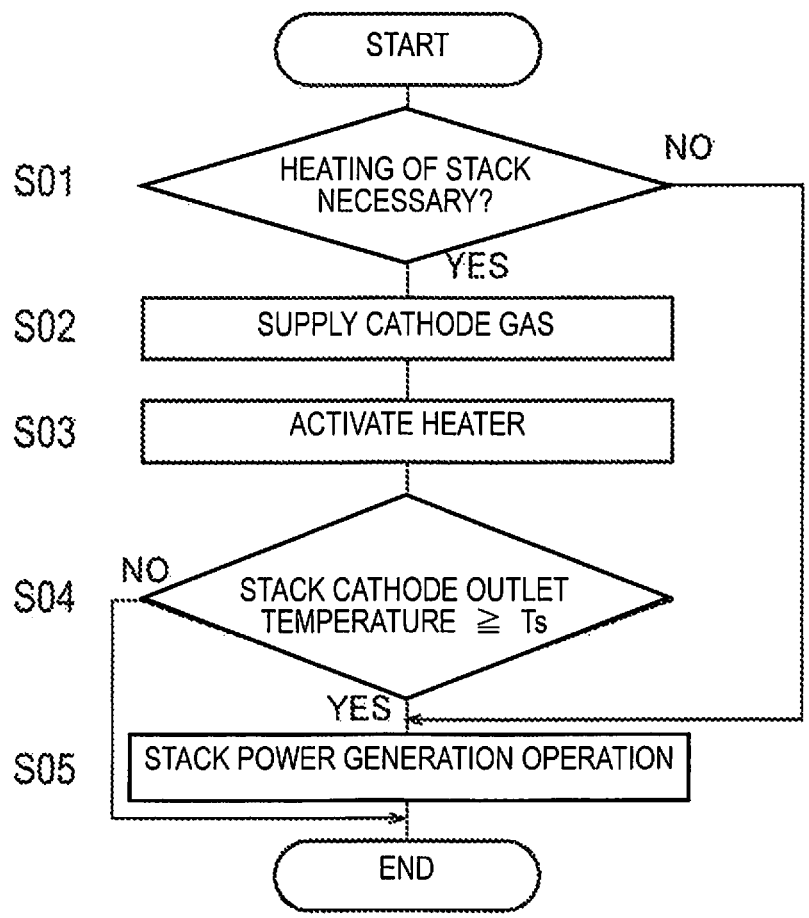
FIG. 17 is a flow chart illustrating a method for using the fuel cell system.

A method for using the fuel cell system 200 will now be described with reference to FIG. 17. FIG. 17 is a flow chart illustrating the method for using the fuel cell system 200.

First, it is determined whether it is necessary to heat the fuel cell stack 10 (Step S01). If a NO determination is made in Step S01, the process proceeds to Step S05. Step S05 will be described further below. On the other hand, if a YES determination is made in Step S01, the process proceeds to Step S02.

In Step S02, the cathode gas is supplied. The heater 61 is then activated by the control unit 210.

It is then determined whether the temperature of the cathode gas outflow port of the fuel cell stack 10 is greater than or equal to a prescribed temperature Ts (step S04). If a NO determination is made in Step S04, the control is ended. On the other hand, if a YES determination is made in Step S04, the process proceeds to Step S05.

In Step S05, an operation to generate power with the fuel cell stack 10 is carried out. After the steps described above, the control of the fuel cell system 200 ends.

As described above, the fuel cell 1 according to the present invention includes the fuel cell stack 10 configured by stacking a plurality of the cell units 100, each including the electrolyte electrode assembly 111 and the separator 120. The fuel cell 1 also includes the casing 20 disposed above the fuel cell stack 10 in the Z direction, and the application part 50 that applies the stacking force F to the fuel cell stack 10 in the Z direction via the casing 20. The fuel cell 1 further includes the facilitating mechanism 60 that facilitates the elongation of the casing 20 due to linear expansion. In addition, the facilitating mechanism 60 includes the space 62 that is provided between the casing 20 and the upper current collector 41, which is provided at the uppermost portion of the fuel cell stack 10, and that absorbs the linear expansion of the fuel cell stack 10 in the Z direction. Further, the inclined surfaces 41a, 20a, which are inclined relative to the Z direction, are provided on the upper current collector 41 and the casing 20, respectively. The upper current collector 41 and the casing 20 are interconnected via the space 62 at the inclined surfaces 41a, 20a. By using the fuel cell 1 configured in this manner, the elongation of the casing 20 due to linear expansion is promoted by the facilitating mechanism 60 during heating. As a result, the upper current collector 41 enters into the space 62 such that the inclined surface 41a of the upper current collector 41 moves along the inclined surface 20a of the casing 20, accompanying the linear expansion of the fuel cell stack 10 in the Z direction. Thus, since the elongation of the electrolyte electrode assembly 111 due to the linear expansion in the Z direction is absorbed, it is possible to suitably prevent an excessively compressive load from acting on the electrolyte electrode assembly 111.

In addition, the facilitating mechanism 60 further includes the heater 61 for heating the gas. Further, the space 62 is the gas flow passage 62 through which the gas heated by the heater 61 flows. By using the fuel cell 1 configured in this manner, the heated gas flows through the gas flow passage 62 in order to facilitate the elongation of the casing 20 due to linear expansion. As a result, along with the linear expansion of the fuel cell stack 10 in the Z direction, the upper current collector 41 enters into the space 62. Thus, since the elongation of the electrolyte electrode assembly 111 due to the linear expansion in the Z direction is absorbed, it is possible to suitably prevent an excessively compressive load from acting on the electrolyte electrode assembly 111.

Further, the gas that flows through the gas flow passage 62 is heating gas that flows inside the fuel cell stack 10 when the fuel cell stack 10 is activated. By using the fuel cell 1 configured in this manner, the heating gas for activating the fuel cell stack 10 flows through the gas flow passage 62. Therefore, as described above, the in-plane temperature distribution of the casing 20 in the XY plane during heating becomes the same as the in-plane temperature distribution of the electrolyte electrode assembly 111. Thus, it is possible to prevent an excessively compressive load from acting on the electrolyte electrode assembly 111 across the entire region of the XY plane.

Further, the gas flow passage 62, which is provided in communication with the space V that is formed between the application part 50 and the fuel cell stack 10, serves as the cathode gas flow passage. By using the fuel cell 1 configured in this manner, heated gas flows into the gas flow passage 62 through utilization of a simple structure.

In addition, as the fuel cell stack 10 is linearly expanded in the Z direction during operation, the upper current collector 41 moves toward the casing 20 in order to seal the gas flow passage 62. By using the fuel cell 1 configured in this manner, it is possible to prevent the upper current collector 41 from being unintentionally cooled by the cathode gas during operation.

Further, the coefficient of linear expansion of the casing 20 is greater than the coefficient of linear expansion of the upper current collector 41. By using the fuel cell 1 configured in this manner, during heating, the casing 20 expands more in the Y direction than the upper current collector 41. For this reason, the upper current collector 41 can more reliably move toward the casing 20. Thus, it is possible to suitably prevent an excessively compressive load from acting on the electrolyte electrode assembly 111.

The fuel cell 1 according to the present invention was described by using the embodiment above, but the present invention is not limited to the content described in the embodiment and may be appropriately modified based on the descriptions of the Claims.

Figure 18:
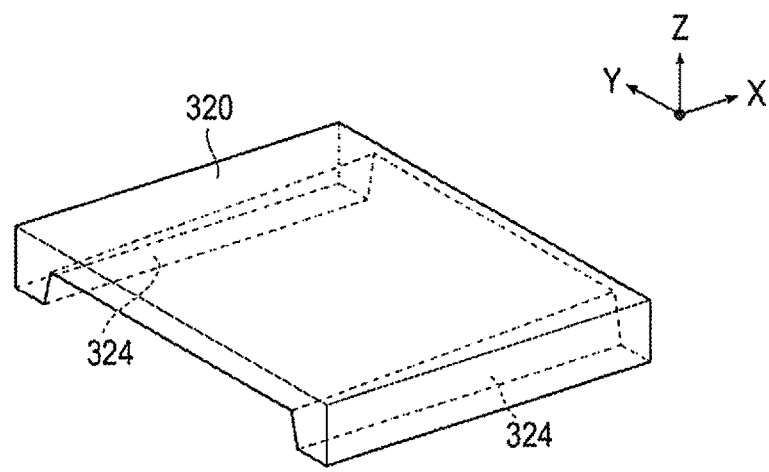
FIG. 18 is a perspective view illustrating the casing of a fuel cell according to a first modification.
Figure 19:
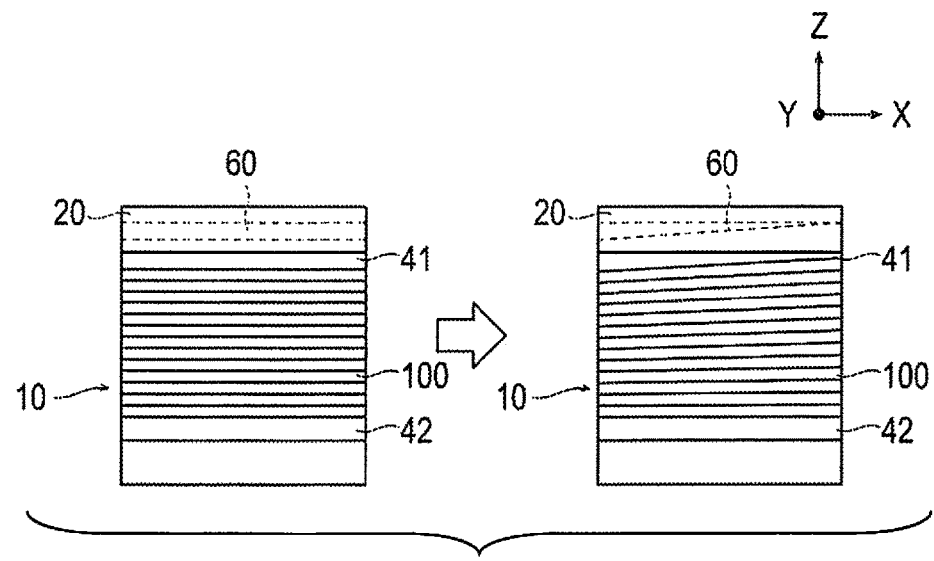
FIG. 19 is a side view of the fuel cell at room temperature and during operation.
Figure 20:
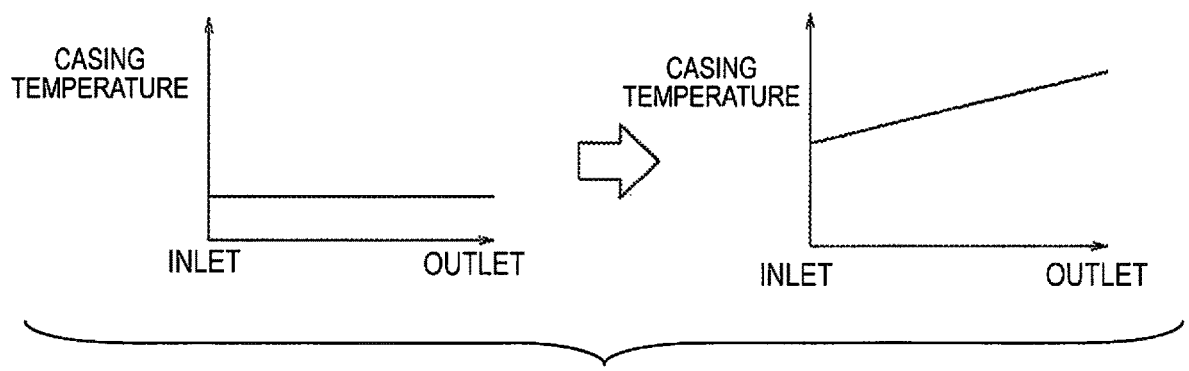
FIG. 20 shows graphs illustrating the temperature distribution of the casing at room temperature and during operation.

For example, in the embodiment described above, the groove portion 24 of the casing 20 is configured to have the same height from the inlet to the outlet, as shown in FIG. 10. However, as shown in FIG. 18, a groove portion 324 of a casing 320 may be configured to be inclined with respect to the X direction (flow direction) such that the outlet is higher than the inlet. By using this configuration, the linear expansion of the fuel cell stack 10 in the Z direction can be absorbed up to a higher temperature on the outlet side than on the inlet side. Thus, as shown in FIG. 20, the linear expansion of the fuel cell stack 10 in the Z direction can be absorbed during operation in which the temperature on the outlet side is higher than that on the inlet side. At this time, as shown in FIG. 19, during operation, the length by which the electrolyte electrode assembly 111 is linearly expanded in the Z direction becomes greater on the outlet side (right side of each figure of FIG. 19) than the inlet side (left side of each figure of FIG. 19).

Figure 21:
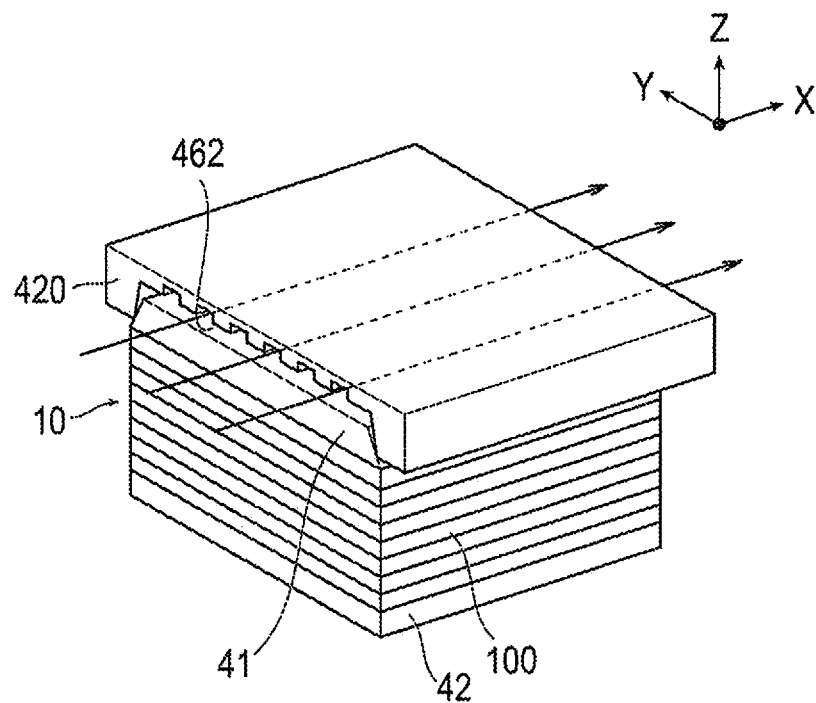
FIG. 21 is a view of a fuel cell according to a second modification corresponding to FIG. 7.
Figure 22:
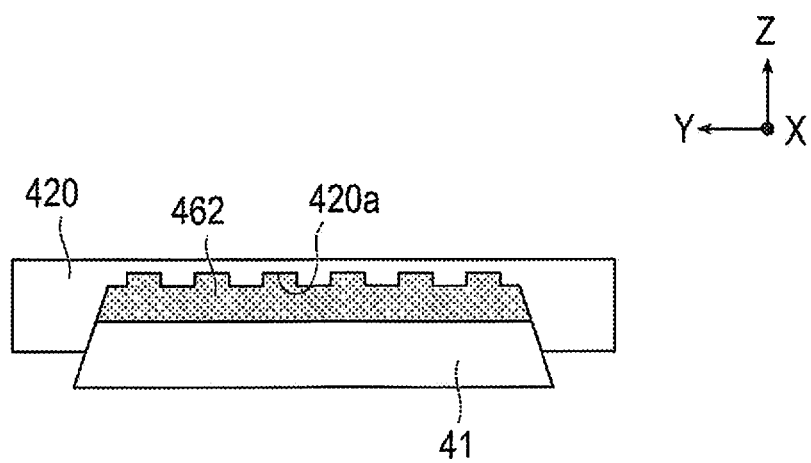
FIG. 22 is a view of the fuel cell according to the second modification corresponding to FIG. 8.

Further, in the embodiment described above, as shown in FIG. 10, the surface of the casing 20 opposing the gas flow passage 62 has a planar shape. However, as shown in FIGS. 21 and 22, convex-concave shapes can be successively formed on a surface 420a of a casing 420 opposing a gas flow passage 462. By using this configuration, since the heat transfer area of the casing 420 is greater compared to that of the casing 20 of the embodiment, the elongation of the casing 420 due to linear expansion is further promoted.

Further, in the embodiment described above, the fuel cell stack 10 has an open cathode type structure, but the cathode gas flow passage may have an internal manifold type structure.

In addition, in the embodiment described above, the gas flow passage 62 is formed only above the upper current collector 41, but in addition to or instead of this, a gas flow passage may be formed below the lower current collector 42.

Further, in the embodiment described above, the inclined surfaces 41a, 20a are provided that have a continuously tapered shape. However, the inclined surfaces may be formed with a stepwise shape.

Figure 23:
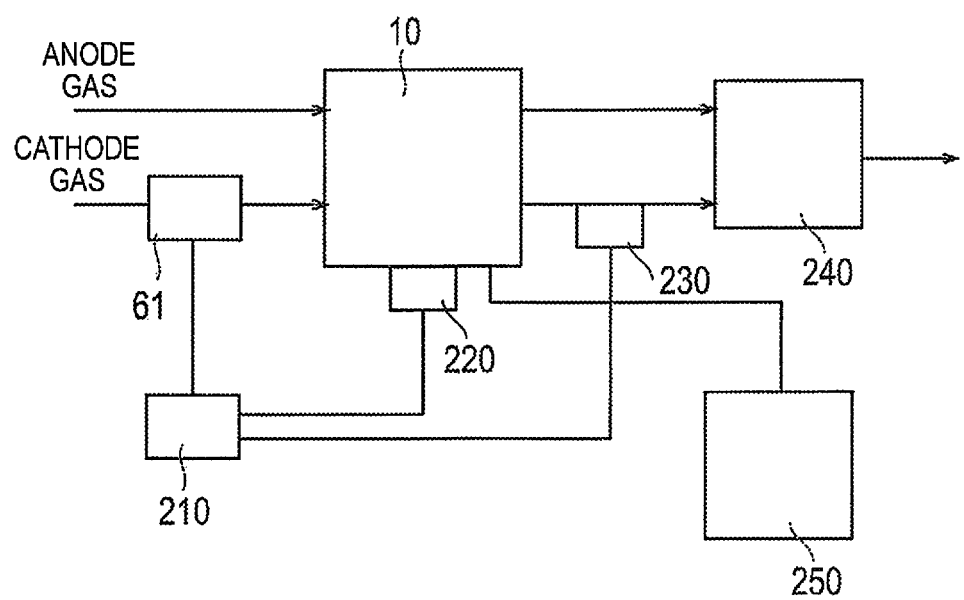
FIG. 23 is a schematic overview illustrating a fuel cell system according to a modification.

In addition, in the embodiment described above, the cathode gas is supplied to the gas flow passage 62 at the time of startup in order to linearly expand the casing 20 in the Y direction. However, as shown in FIG. 23, a separate heating gas independent of the fuel cell system 200 may be supplied in order to linearly expand the casing 20 in the Y direction.

The invention claimed is:

1. A solid oxide fuel cell comprising:
   a fuel cell stack configured by stacking a plurality of cell units, each of the cell units including a separator and an electrolyte formed of a solid oxide material;
   a casing disposed at one end side of the fuel cell stack in a stacking direction;
   a cover comprising an upper casing hood and a lower casing hood that are configured to apply a force in the stacking direction, the upper casing hood covering the casing in the stacking direction; and
   a facilitating mechanism that facilitates elongation of the casing due to linear expansion,
   the facilitating mechanism having a space that is provided between the casing and an end current collector, which is provided at an end portion on one end side of the fuel cell stack, and that absorbs the linear expansion of the fuel cell stack in the stacking direction,
   each of the end current collector and the casing includes an inclined surface that is inclined relative to the stacking direction, and the end current collector and the casing are interconnected at the inclined surfaces via the space, and
   the end current collector having a same outer shape as each of the plurality of cell units when viewed in the stacking direction.

2. The solid oxide fuel cell according to claim 1, wherein the facilitating mechanism further includes a heater for heating a gas, and
   the space is a gas flow passage through which the gas heated by the heater flows.

3. The solid oxide fuel cell according to claim 2, wherein the gas that flows through the gas flow passage is heating gas that flows inside the fuel cell stack when the fuel cell stack is activated.

4. The solid oxide fuel cell according to claim 2, wherein the gas flow passage is provided in communication with a space formed between the application part and the fuel cell stack to serve as a cathode gas flow passage.

5. The solid oxide fuel cell according to claim 2, wherein the end current collector moves toward the casing to seal the gas flow passage as the fuel cell stack expands linearly in the stacking direction during operation.

6. The solid oxide fuel cell according to claim 2, wherein the casing has a coefficient of linear expansion that is greater than a coefficient of linear expansion of the end current collector.

7. The solid oxide fuel cell according to claim 2, wherein a convex-concave shape is successively formed on a surface of the casing that faces the gas flow passage when viewed in a gas flow direction.

8. The solid oxide fuel cell according to claim 2, wherein the gas flow passage is provided so as to be inclined with respect to a gas flow direction such that a height of the gas flow passage on an outlet side of the gas flow passage is higher than on an inlet side of the gas flow passage.

9. The solid oxide fuel cell according to claim 1, wherein the upper casing hood has a box shape, and the upper casing hood and the lower casing hood entirely surround the fuel cell stack.

10. The solid oxide fuel cell according to claim 1, wherein the inclined surface of the end current collector has a continuously tapered shape extending to an edge of the end current collector.

* * * * *